United States Patent [19]

Moussally et al.

[11] Patent Number: 5,673,050

[45] Date of Patent: Sep. 30, 1997

[54] THREE-DIMENSIONAL UNDERGROUND IMAGING RADAR SYSTEM

[76] Inventors: George Moussally, 33185 Lark Way, Fremont, Calif. 94555-1117; Robert Ziernicki, 615 Milverton Rd., Los Altos, Calif. 94022; Philip A. Fialer, 742 Torreya Ct., Palo Alto, Calif. 94303; Fred Judson Heinzman, 820 Vista Grande Ave., Los Altos, Calif. 94024

[21] Appl. No.: 664,176

[22] Filed: Jun. 14, 1996

[51] Int. Cl.$^6$ ............................................. G01S 13/04
[52] U.S. Cl. ................................... 342/22; 342/25
[58] Field of Search ................................. 342/22, 25

[56] References Cited

U.S. PATENT DOCUMENTS

| | | | |
|---|---|---|---|
| 3,806,795 | 4/1974 | Morey | 342/22 |
| 4,246,580 | 1/1981 | Caputi, Jr. | 342/25 |
| 4,325,065 | 4/1982 | Caputi, Jr. | 342/25 |
| 4,546,354 | 10/1985 | Boles | 342/25 |
| 4,546,355 | 10/1985 | Boles | 343/17 |
| 4,723,124 | 2/1988 | Boles | 343/17 |
| 4,831,383 | 5/1989 | Ohnishi et al. | 342/22 |
| 4,839,654 | 6/1989 | Ito et al. | 342/22 |
| 4,967,199 | 10/1990 | Gunton et al. | 342/22 |
| 4,989,008 | 1/1991 | Fujisaka et al. | 342/25 |
| 4,999,635 | 3/1991 | Niho | 342/25 |
| 5,012,249 | 4/1991 | Chan | 342/25 |
| 5,061,931 | 10/1991 | Farina et al. | 342/22 |
| 5,327,139 | 7/1994 | Johnson | 342/22 |
| 5,495,248 | 2/1996 | Kawase et al. | 342/25 |
| 5,541,605 | 7/1996 | Heger | 342/85 |
| 5,557,277 | 9/1996 | Tricoles et al. | 342/22 |
| 5,592,170 | 1/1997 | Price et al. | 342/22 |

*Primary Examiner*—J. Woodrow Eldred
*Attorney, Agent, or Firm*—Hoffman, Wasson & Gitler, P.C.

[57] ABSTRACT

An ultra-wide band ground penetrating radar (GPR) system providing non-invasive detection and three-dimensional mapping of underground objects and voids. The performance of this radar provides improved underground object detection, location and identification over existing radars through the use of a novel interrupted, frequency modulated, continuous wave (FMCW) signal waveform. A synthetic aperture radar (SAR) technique known as spotlight mode focused (SAR) operation is used to collect data for the underground area of interest, by circumscribing this area with a radar beam provided on an airborne or ground based vehicle. Near-Brewster angle illumination of the ground is used to reduce losses.

20 Claims, 6 Drawing Sheets

THREE-DIMENSIONAL UNDERGROUND IMAGING RADAR SYSTEM

BACKGROUND OF THE INVENTION

Various systems and techniques have been employed for a large number of years to endeavor to determine the composition or make-up of the earth, both at a distance near the earth's surface as well as a distance many miles below the earth's surface. For example, mineral engineers have utilized a technique in which a shock wave is generated at the earth's surface or below the earth's surface and various sensors have been utilized to sense a return wave. The particular manner in which this return wave is received and recorded by the sensors would be an indication of the compositions of a subterranean layer of the earth, generally at a distance far removed from the earth's surface. While a number of these techniques appear to produce satisfactory results when determining whether a particular subterranean location might possess natural gas or petroleum products, none of these systems can be used to determine the composition of the earth immediately below its surface to determine the existence of objects in this region. This is particularly important when various companies or governmental agencies, such as the Environmental Protection Agency (EPA), would want to investigate a particular site to determine whether hazardous wastes are buried below the surface.

Several systems have been developed which utilize ground penetrating radar to determine the character of a subterranean region close to the earth's surface. For example, U.S. Pat. No. 3,806,795, issued to Morey, repetitively uses ground penetrating radar pulses with rise times of the order of one nanosecond to generate a profile chart indicating the magnitudes of the reflected signals and the depths or times at which they occur. This system employs the same antenna for transmitting and receiving signals and does not utilize a synthetic aperture radar (SAR) technique nor does it use three-dimensional imaging of the reflective signals.

U.S. Pat. Nos. 4,325,065 and 4,246,580, both issued to Caputi, Jr., teach the use of a bistatic radar technique employing a spotlight SAR and stretch linear FM modulation with Fourier Transform processing. The receiver and transmitter are mounted on different aircraft which have different positions and motions during the data gathering process. Not only do these patents relate to a system in which bistatic synthetic aperture radar data and not monostatic data is employed, the purpose of this system is radically different than that of the present invention in which a subterranean section close to the earth's surface is investigated.

U.S. Pat. No. 4,381,544, issued to Stann, is directed to a process and apparatus for geotechnic exploration utilizing an airborne ground penetrating radar (GPR) system which is intended to penetrate as much as 50 feet below the surface. Three impulse radars at frequencies such as 280, 480 and 1300 MHz which radiate interleaved pulses are employed. A conventional radar altimeter signal is used with the three impulse radar outputs to detect and identify various ground materials by their characteristic variations in scattering at the three frequencies. Data is recorded as well as being routed to hard copy printers and color displays. The primary application for this system is to evaluate subsurface conditions such as in Alaska to best choose a route for the pipeline. This system could also be used in archeology and to locate military underground silos. However, it is important to note that only impulse type radar techniques looking directly downward without the application of synthetic aperture processing are employed.

U.S. Pat. No. 4,723,124, issued to Boles, does employ SAR technology with airborne radars for ship classification. Although teachings in this patent are directed to compensating images for ship motion, particularly repetitive roll motions so as to provide better image resolution and thereby better identification of ship type, it would be very difficult to apply these techniques to the situations contemplated by the present invention. Similarly, U.S. Pat. Nos. 4,546,354; 4,546,355; and 4,563,686, all issued to Boles, are used for ship classification and detection.

The system of the present invention was developed to perform non-invasive subsurface characterization in numerous practical situations including location and characterization of buried waste, location of underground utilities and structures prior to excavation operations and determination of subsurface geological conditions for construction, mineral extraction and environmental purposes, at depths close to the earth's surface. The need for environmental clean-up has been recognized as a world-wide necessity. An essential pre-remediation site assessment phase is required for most clean-up projects. The ability to precisely locate and characterize underground objects and structures provides an essential technical capability to counter-drug, counter-terrorism, military and intelligence operations. Targets in these operations consist of tunnels, buried bunkers, buried stores of ammunition, weapons or drugs, pipelines, unexploded ordinance, mines and critical buried mobile targets.

Military sites are now required to identify, recover, and clean-up chemical weapons. The United States Army burial of chemical weapons dates back to World War I with few records in existence to identify the actual burial location of toxic weapons. Two hundred fifteen known burial sites have been identified by the United States Army alone. Military agencies are requesting systems capable of identifying underground missile launches, bunkers and weapons.

Another application for the technology of the present invention exists in construction. Utility construction and repair is a prime application for this invention. Often, records are not available to indicate the current placement of underground utilities. The public street subsurface is now becoming increasingly crowded with buried utility lines, telephone cables, storm sewers, gas lines and water lines. Cutting into this complex structure without knowing the exact location of each and every underground utility can often add to existing problems.

SUMMARY OF THE INVENTION

These and other deficiencies of the prior art are addressed by the present invention which is used to detect and recognize underground objects and voids near the surface of the earth. The present invention would accomplish these purposes by employing a stand-off, oblique angle illumination of the subsurface region using an interrupted frequency modulated continuous wave (FMCW) operation of the radar. The system would use an ultra-wind bandwidth (greater than one decade) as well as a spotlight SAR geometry. Furthermore, using precision repeater ranging and radar position estimation, motion compensation is addressed. Additionally, near-Brewster angle illumination of the ground is used to reduce losses. This system would then provide automatic underground object detection, location and identification by correlation with stored characteristics of underground object scattering based on object size, orientation, spatial scattering and complex permittivity of surrounding medium and frequency.

The present invention addresses all of the problems of the prior art by employing an ultra-wide band ground penetrating radar system utilizing an interrupted, frequency modulated, continuous wave (FMCW) signal wave form. A spotlight mode synthetic aperture radar (SAR) is used to collect data of the underground area of interest. Radar signals are generated on an airborne vehicle or on a movable ground based station. A number of repeater receivers located around the area of interest are used to focus the radar on an object at a particular range. Since the radar signal is transmitted from a moving source, the use of at least three repeater receivers would compensate for the motion of the transmitted radar signal. The radar transmitter of the ground based station or the airborne vehicle is positioned at a height such that the energy would strike the ground at an angle of incidence approximately equal to the Brewster angle. When a transmitted wave strikes the ground at approximately the Brewster angle and with vertical polarization, the amount of forward scattered energy is minimized and the fraction of the signal power entering the ground is maximized, thereby improving the efficiency of the operation.

The radar technique of the present invention operates in a "stand off" mode, that is at a significant distance from the underground area of interest. The spotlight mode SAR technique utilized by the present invention employs curved paths consisting of arcs of approximate circles around the area of interest while the antenna points toward the area of interest. This provides the data required to produce a three-dimensional mapping of the underground region and also enhances the detectability of underground objects.

The present invention uses a matched filter correlation processing technique which would compare the observed characteristics of the signals reflected from the underground objects with a library of stored functions of known reflectance (i.e., electromagnetic scattering), characteristics of various types of objects and orientations to provide automatic object detection, location and identification.

Applications of this radar would include, but be not limited to, locating buried waste containers and plumes, searching for unexploded ordinance, detecting voids such as tunnels, mine shafts and wells, locating underground pipelines and cables, analyzing the subsurface geophysical environment and analyzing structures such as pavements which extend below the ground surface.

For a more complete understanding of the invention, reference should now be made to the embodiments illustrated in greater detail in the accompanying drawings and described below by way of example.

DETAILED DESCRIPTION OF THE INVENTION

Figure 1:
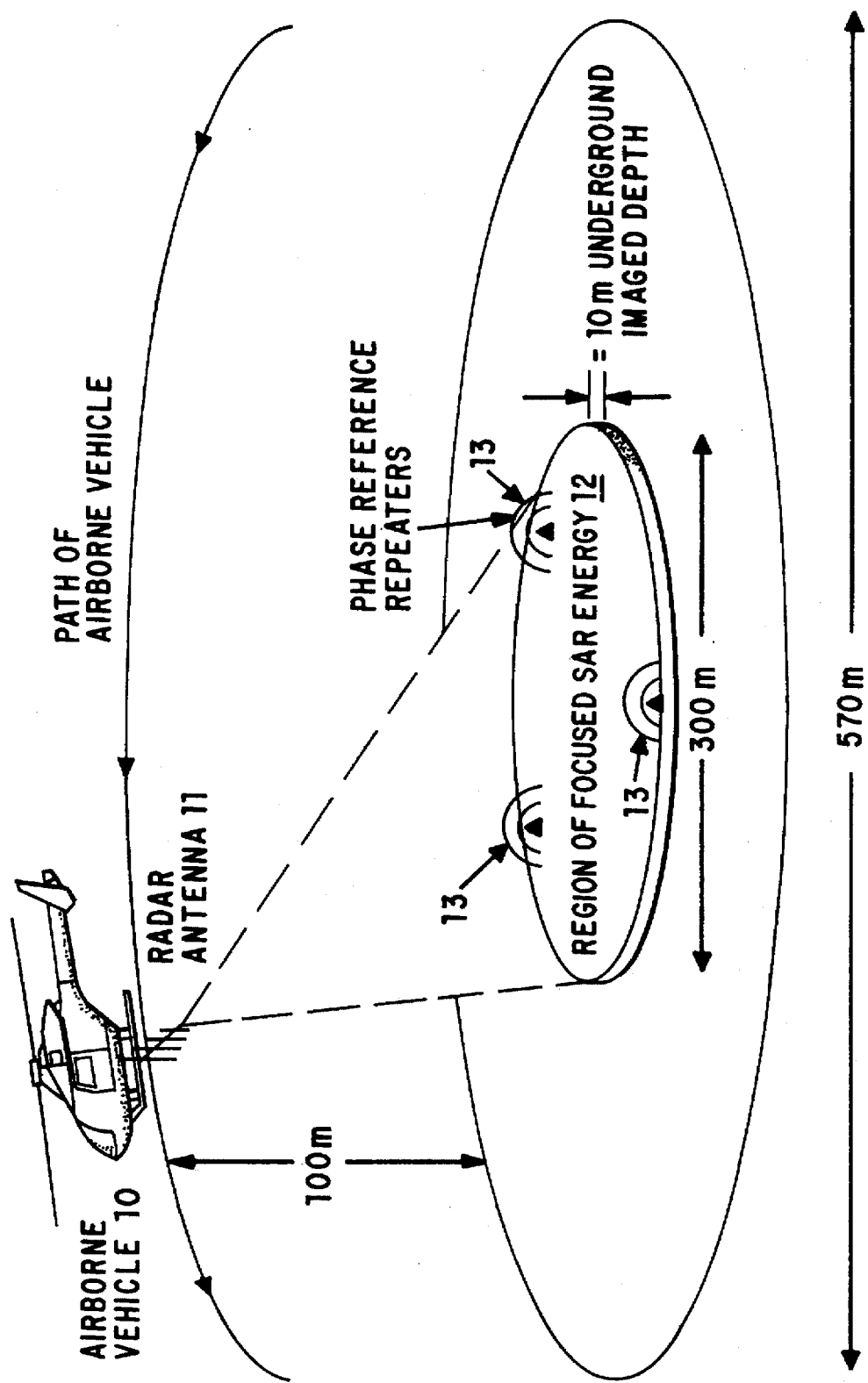
FIG. 1 is a drawing showing a typical airborne data collection geometry.
Figure 2:
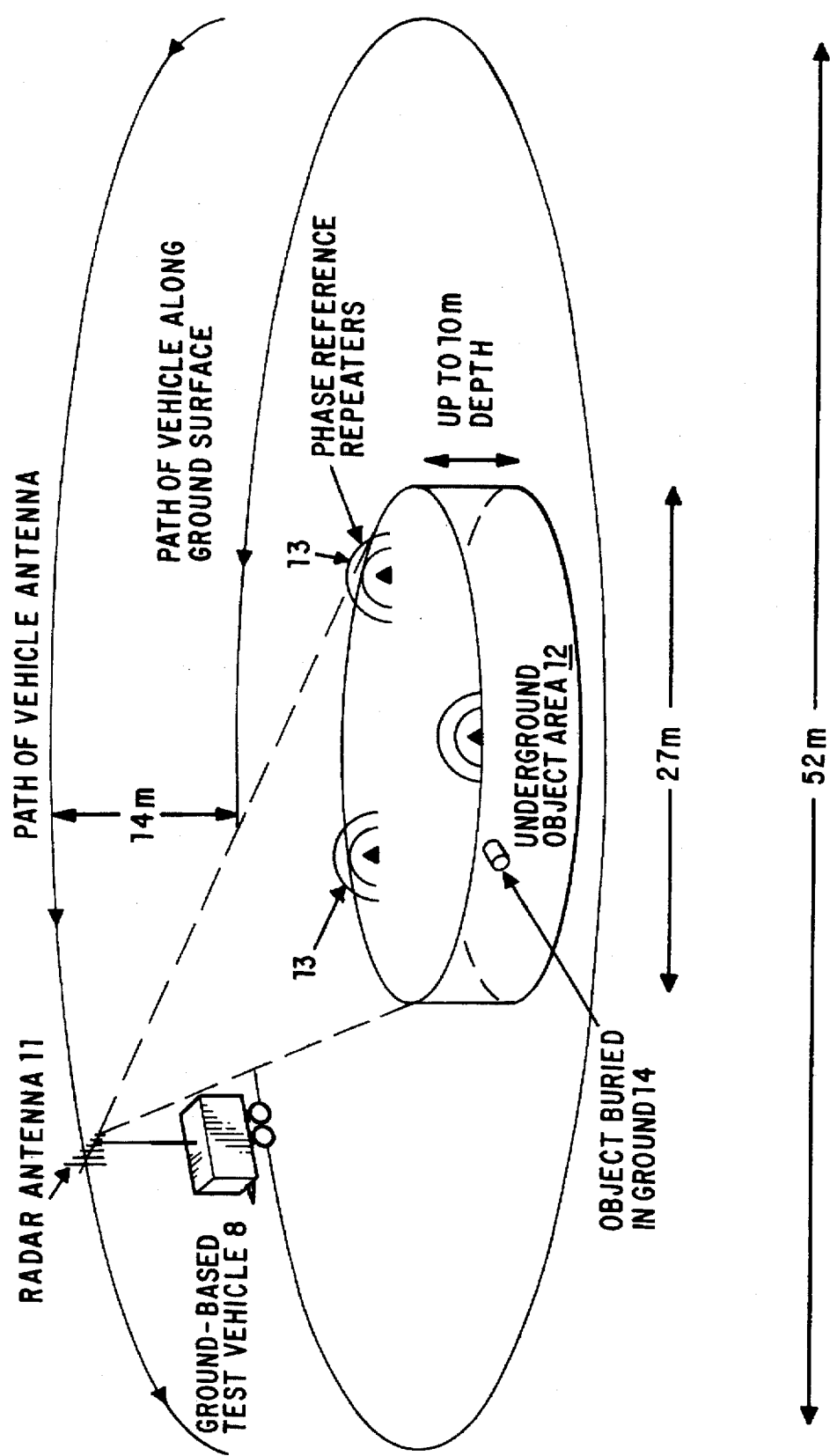
FIG. 2 is a drawing showing a typical ground based data collection geometry.

FIG. 1 illustrates the present invention in which a radar antenna 11 is provided with or attached to, in a conventional manner, to airborne vehicle 10 such as a helicopter. As shown in FIG. 1, the helicopter moves around a curved path surrounding a subterranean region of interest. Typically, the helicopter would maintain an altitude of approximately 100 meters. However, as can be easily appreciated, the exact height of the vehicle 10 as well as the radar antenna 11 is not of crucial importance as long as the radar is focused onto the region of interest and can produce a wave which would enter the region of interest at an appropriate angle. The radar antenna 11 and the vehicle 10 are moved along a curved path such as an arc of an ellipse or circle around the region of interest 12, while continuously illuminating this region with the radar. A set of phase reference repeaters 13 is used in a position location system with the radar to enable the coherent processing of the signal reflections received from various buried objects 14 (as shown in FIG. 2). The radar antenna 11 would serve as both a device for transmitting the appropriate radar pulse as well as a device for receiving the radar pulse reflected from the underground object 14 in the region of interest 12. The radar data is used to form a three-dimensional map describing the location and the likely identity and orientation of the buried object.

As illustrated in FIG. 1, the radar system according to the present invention is designed to locate and identify objects which are close to the surface of the earth, such as in the range of approximately 0–10 meters. Furthermore, as shown in FIG. 1, when an airborne antenna is employed, the region of interest would be provided within a circle or ellipse having a diameter or major axis extending for approximately 300 meters. In this situation, the airborne vehicle 10 would travel along an arc of the circle or ellipse having a diameter or major axis of approximately 570 meters. However, it should be noted that the exact dimensions of the diameter or major axis of the region of interest as well as the paths that the airborne vehicle travels is not of crucial importance and could be more or less than these distances.

FIG. 2 shows a typical data collection geometry when the radar antenna 11 is attached to a ground based test vehicle 8 which would encircle the region of interest 12 in which the underground object to be identified 14 is buried. In this instance, the radar antenna 11 would be approximately 10 to 15 meters above the ground and directed into the region of interest such that the transmitted radar signals would enter the ground at an appropriate angle to allow reflected signals from the ground which are received by the radar to produce appropriate signals such that the underground object can be located and identified. Similar to the embodiment shown in FIG. 1, a number of phase reference repeaters 13 are deployed on the periphery of the region of interest. Additionally, when employed on a ground based vehicle 8 is also used to locate and identify underground objects in a depth of approximately 10 meters. However, when a ground based vehicle is used, the diameter of a circle or the major axis of an ellipse which would delimit the region of interest would be approximately 25 to 30 meters. In this situation, the diameter or major axis of the circle or ellipse traversed by the ground based vehicle would be approximately 45 to 60 meters.

The process of forming a synthetic aperture with a radar by coherently integrating data gathered while the radar is moving along an approximately linear path is well established in the prior art. A common implementation is the airborne side-looking radar used to develop two-dimensional maps of the earth's surface features. Coherent processing of radar reflection from successive positions along the flight path allows cross-range resolution to be dramatically improved up to values to be expected from a linear antenna array with width equal to the length of the flight path that has been coherently processed.

In the focused SAR mode of operation according to the present invention, coherent signal processing is used to focus the radar on an object at a particular range. This requires phase corrections for each measurement to equalize the ranges to the underground object at the focus point. The spotlight mode of illumination according to the present invention is used with coherent signal processing to form three-dimensional volume elements (voxels) which comprise the radar image. Each data sample from each radar sweep at each radar position contributes to the radar image. A motion compensation system (explained in more detail later) is used to measure the antenna position very accurately during each sweep of the radar frequency range to provide the required position data to a high degree of precision.

Figure 3:
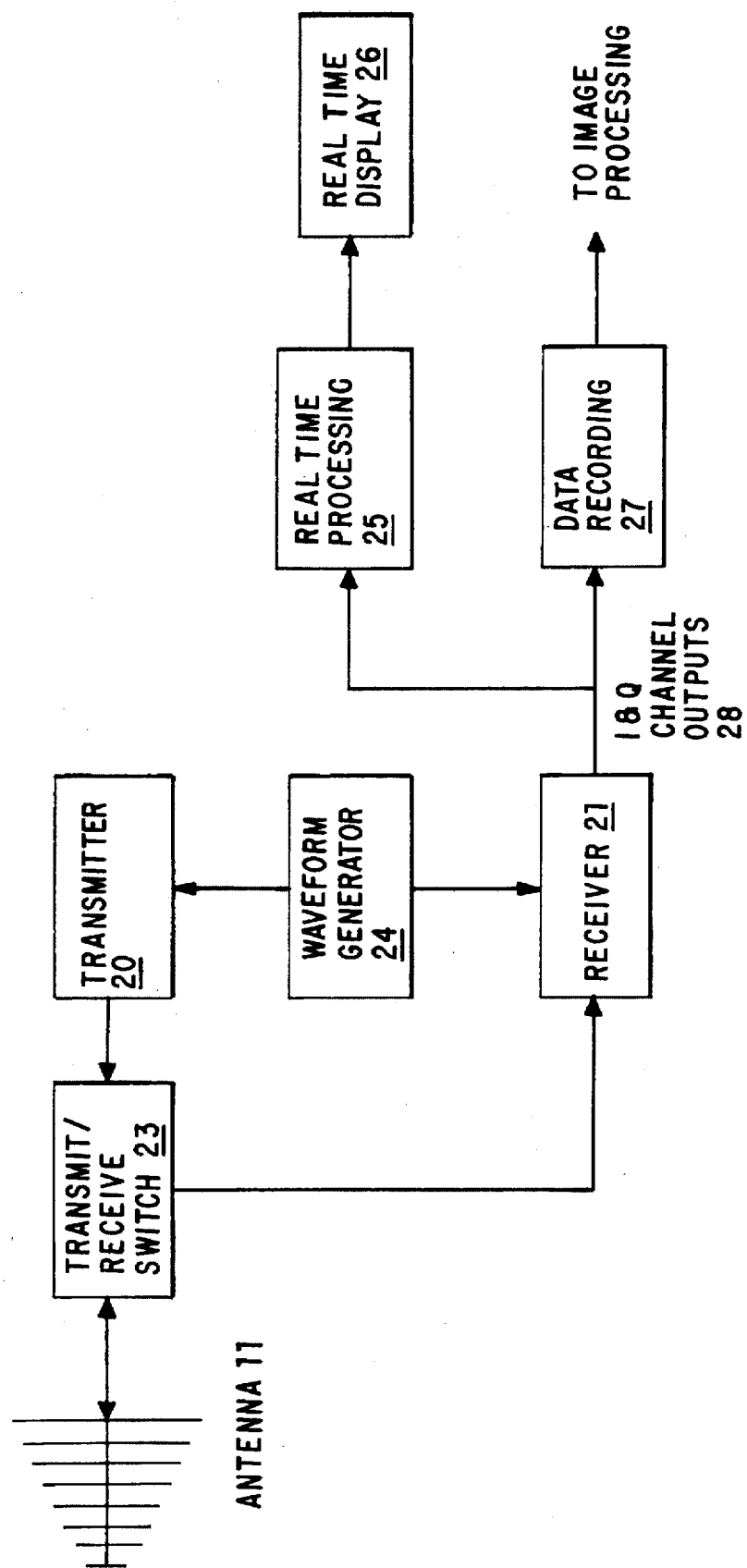
FIG. 3 is a block diagram showing the ground penetrating radar (GPR)

FIG. 3 illustrates the ground penetrating radar (GPR) system. The radar uses a frequency modulated, continuous wave (FMCW) waveform in a monostatic (signal antenna) mode of operation. A transmitter 20 and a receiver 21 are alternately connected to the radar antenna 11 through a transmit/receive switch 23 for short periods of time, generally several nanoseconds to several microseconds. A waveform generator 24 is connected to both the transmitter 20 as well as the receiver 21 and provides an exciter signal for the transmitter and a replica of that signal to the receiver for use as a reference during signal demodulation. The receiver output is digitized and provides two output paths. One path consists of a real time processor 25 based upon a Fast Fourier Transform (FFT) algorithm. The FFT data is displayed on a real time display 26 allowing the operator to monitor the data gathering process. The second path of the data recorder 24 for the digitized receiver in-phase and quadrature phase (I and Q) outputs 28 from the receiver 21 for subsequent computer based three-dimensional image processing. This data is sent to a data recorder 27 for future reference. The signals from the phase reference repeaters 13 are embedded within the received radar data and no special hardware is needed to process them.

Focused SAR operation requires continual knowledge of position of the radar relative to the underground region of interest at all times during data acquisition with a precision of a fraction of a wavelength. Ground penetrating radars of the type considered here often utilize wavelengths which are as small as a fraction of a meter. Thus, the focused SAR operation requires knowledge of the radar position in three dimensions to a precision of the order of a few centimeters. With this precision in positioning, the motion of the radar can be adequately compensated by the signal processing and signal reflections from various locations to be combined in a phase sensitive, coherent fashion.

Figure 4:
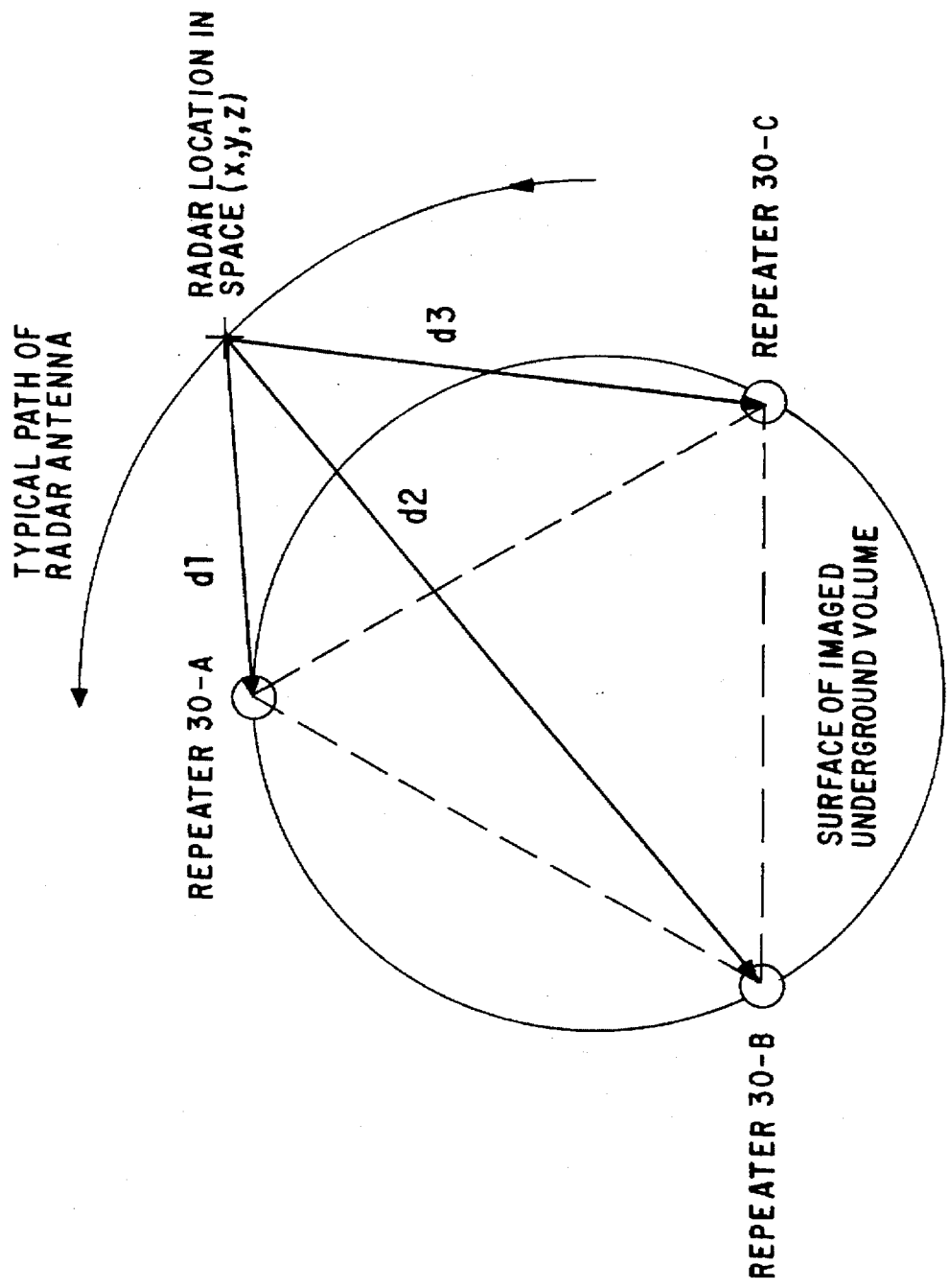
FIG. 4 is a plan view of a typical repeater geometry for data collection.

To be effective, the focused SAR operation must use a minimum of three radar phase reference repeaters situated in the general area of the underground region of interest. The radar continually measures the range to each of the repeaters to a precision in the order of a centimeter. FIG. 4 shows a plan view of a typical repeater geometry for data collection. Three repeaters 30A, 30B and 30C are located on the point of an equilateral triangle around which the imaging area can be circumscribed. Each repeater receives the transmitted radar signal and retransmits a uniquely modified replica of that signal. The retransmitted signals are received by the radar receiver and used to compute the ranges $d_1$, $d_2$ and $d_3$ to each of the repeaters with respect to the radar, using the same hardware capabilities used for underground object range measurements. Additional signal processing of the radar data is used to identify and track the repeater signals and to calculate the range to each repeater. The hardware used to make these calculations is implicitly included in the subject matter illustrated in FIG. 3. While three is the minimum number of independent range measurements supporting full three-dimensional unambiguous calculation of radar location, additional repeaters can be utilized to improve position accuracy if needed. An alternative, but less precise method of motion compensation, is to measure the position of the radar with respect to the underground object area provided by a global positioning system (GPS) data.

Commonly available GPR's use high speed switching technology to transmit a very short pulse (i.e., impulse) and process underground object area reflected energy in the time domain by sampling or digitizing techniques. The present invention differs from this approach since it utilizes a continuous wave signal which frequency varies with time and with the processing of the collective data being performed in the frequency domain. Furthermore, the signal is periodically gated or interrupted as the signal sweeps through the frequency range of operation.

In a linear FMCW radar, the transmitter is frequency modulated with a linear change of frequency verses time, or "sweep". The range of a detected object can be measured correctly by observing the frequency difference between the current transmit frequency and the frequency of the detected object return. The frequency difference, due to the round trip propagation time, is a measure of the object range. If the object or radar are moving, a Doppler shift in the object reflected signal frequency is also observed. The radar waveform to be utilized in any application is defined to provide unambiguous range over the velocity range utilized.

The FMCW radar receiver converts the signals reflected from the underground object area to a low or zero intermediate frequency and then samples the receiver output for frequency domain processing. The present invention adds an interruption process to avoid the isolation problem inherent in other FMCW radars in which the transmitter and receiver operate simultaneously. According to the present invention, the transmitter and receiver are turned on alternately, at approximately a 50% duty factor each to avoid the need to transmit and receive at the same time. The transmission and receiving durations are chosen to correspond to the round trip propagation time to a maximum buried object range. This interrupted FMCW waveform typically involves a relatively long duration linear FM sweep with many interruptions and samples during a single FM sweep. The interrupted FMCW system provides several benefits. Initially, it overcomes the average power limitations often experienced by impulse transmitters. These transmitters are ordinarily limited to a fraction of a watt of average power. By contrast, the interrupted FMCW waveform of the present invention permits average power levels of many watts to be readily available. This additional available transmitting power can provide direct benefits in greater object detection depth by overcoming the losses inherent in underground signal propagation.

A second benefit of the interrupted FMCW waveform is that it allows the use of direct digital synthesis to generate very precise and repeatable linear FM sweeps which supports the use of high sensitivity radar receivers. The high sensitivity results from narrow bandwidths and long coherent integration times. The impulse based systems must use very wide bandwidth receivers which have much lower sensitivity. The combination of higher average transmitter power and higher receiver sensitivity further adds to the maximum depth which the object can be detected for a given frequency. This is important because the desire for good range (depth) resolution requires higher operating frequencies which have significantly higher propagation losses through the ground.

The third major benefit of the interrupted FMCW waveform is the reduced sensitivity to interference from other signals in the electromagnetic environment since nearly all GPR's operate in frequency regions shared by television and FM broadcast stations with very powerful radiated signal levels. Interference generated by the radar transmitter and vulnerability to externally generated interference can be significantly reduced when using the interrupted FMCW waveform. Impulse radars may be interfered with by other signals. The interrupted FMCW waveform is quite tolerant of blanking of specific interfering frequencies when transmitting or receiving.

The present invention employs an ultra-wide span of operating frequencies or bandwidth. Typical bandwidths are from one to two decades which means that the highest frequency is 10 to 100 times higher than the lowest operating frequency. Because the depth (range) resolution of any radar is improved in direct proportion to the bandwidth, a wide bandwidth provides good resolution of underground object details. Losses involved in propagation through the ground may vary widely depending on the type of ground. However, the losses tend to increase very rapidly at higher frequencies. Therefore, it is preferred that the lowest possible operating frequencies which can provide the needed bandwidth should be used. Therefore, a bandwidth of a decade or more is usually chosen which is generally labelled as an ultra-wide bandwidth.

Figure 5:
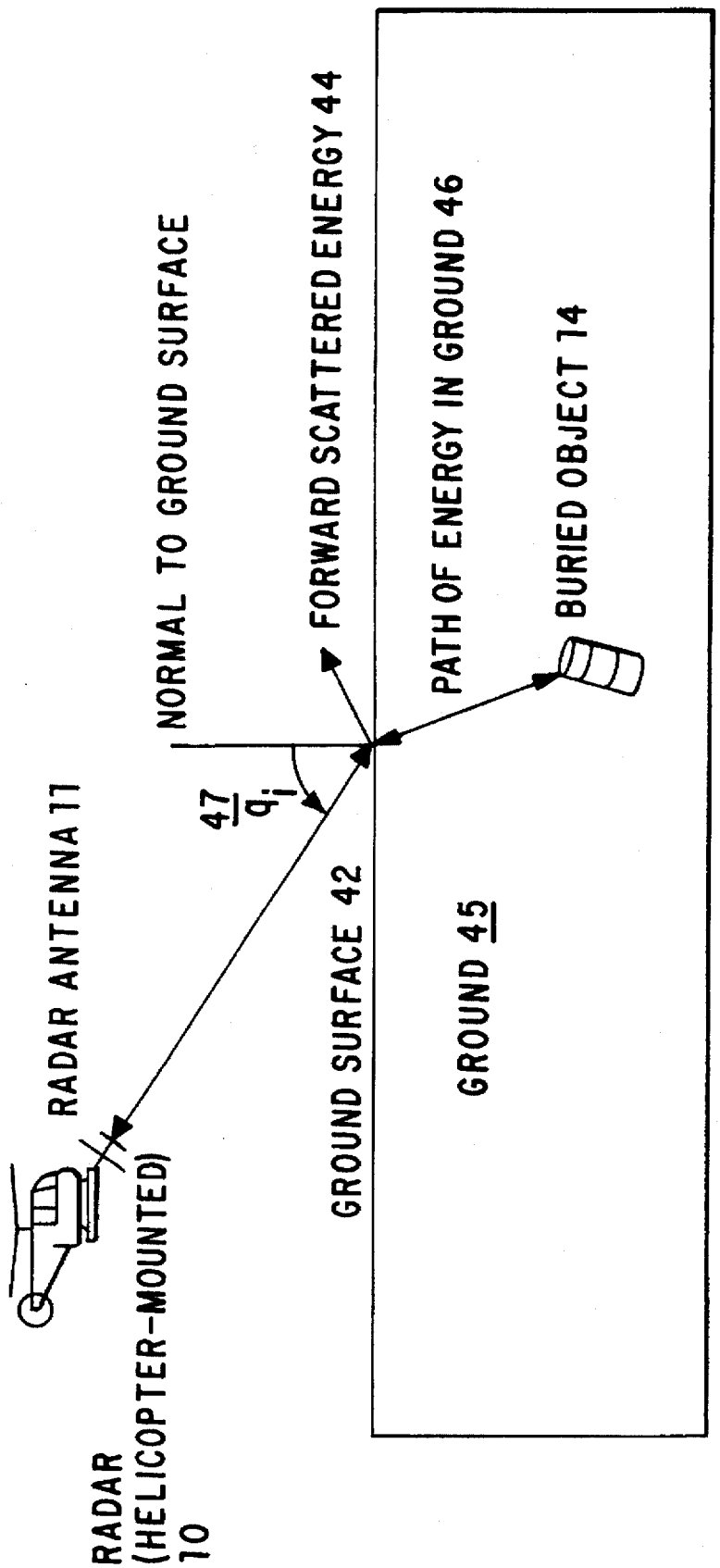
FIG. 5 is a view showing a typical radar signal propagation path.

FIG. 5 illustrates a simplified general path of radar signal propagation generated by the present invention. Signals transmitted from the radar antenna 11 included on, for example, an airborne vehicle 10 such as a helicopter, propagate through the air to a point on the ground surface 42 near the underground object to be detected 14. The propagation through the air is fairly ideal in travelling substantially in a straight line and with little attenuation beyond the usual spreading loss. Although this figure illustrates the use of an airborne antenna, it has equal applicability to a ground based antenna.

When the radar signal strikes the ground, a portion of the incident energy scatters in a forward direction as it is reflected off the surface while the remainder of the energy penetrates into the ground 45. The reflected energy is lost and reduces efficiency. The ray path 46 of the portion of the signal entering the ground bends to a more vertical angle by a process known as refraction. This signal travels downward toward the underground object 14. The refraction and reflection processes are complex. The ratio of the reflected energy to the refracted energy is dependent upon the angle of incidence of the radar signal 47 shown as $\theta_i$ in FIG. 5. This angle is referenced to the normal to the ground surface. The present invention uses vertical signal polarization at the radar antenna and arranges the height of the radar above the ground such as have the energy strike the ground in the area of the underground object 14 at an angle of incidence $\theta_i$ approximately equal to the Brewster angle. When the transmitted wave strikes the ground at approximately the Brewster angle with a vertical polarization, the amount of forward scattered energy 44 is minimized and the fraction of the signal power entering the ground 46 is maximized. This improves frequency of operation and enhanceability to detect and locate underground objects. The part of the energy refracted into the ground is propagated downward toward the underground object 14 and will encounter additional losses due to the propagation through a lossy medium.

The refracted wave will travel at a slower velocity than in air. The amount of losses and reduction in velocity of propagation are a function of the conductivity and complex permittivity of the ground. Practical difficulties arise because the electrical characteristics of the ground differ widely depending on the frequency, the type of material comprising the ground, and also with the moisture content of the ground. These effects can be accommodated within the signal processing.

When the radar signal strikes an underground object, some of the energy will be reflected or scattered. The propagation from the underground object toward the radar will follow similar paths encountering reflections and refractions at the surface. The signal processor utilized by the present invention determines the object's presence, type and location based upon the characteristics of these scattered signals.

Figure 6:
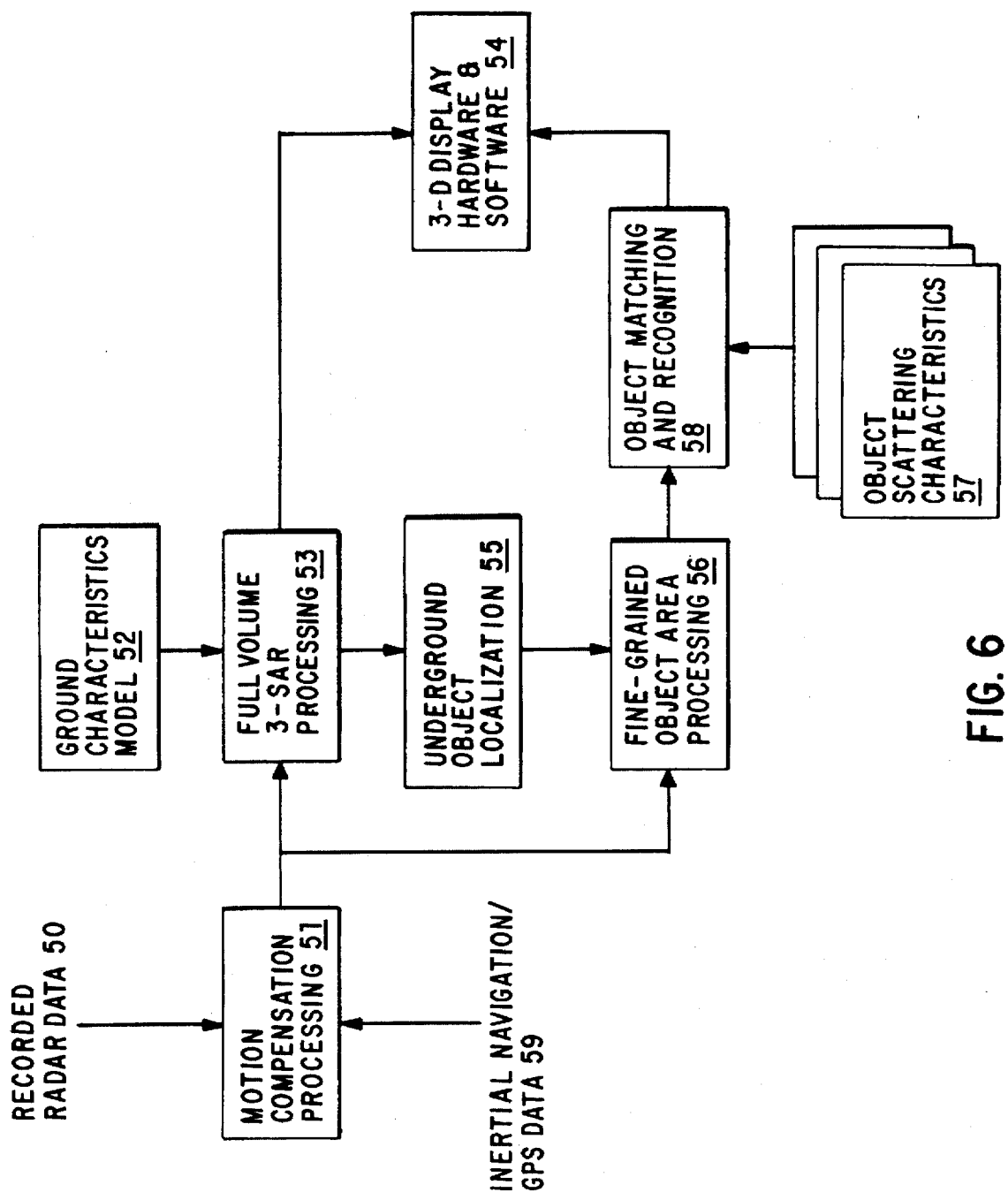
FIG. 6 is a simplified flow diagram showing data processing.

Data received by the radar antenna 11 is transmitted to an image processor illustrated with respect to FIG. 6. The image processing is ordinarily accomplished after the radar gathering process is complete since it typically entails large amounts of computer based processing to generate three-dimensional map images. As shown in FIG. 6, the recorded data from the mobile radar unit 50 which comprises sets of digitized in-phase and quadrature (I & Q) data samples as shown in FIG. 3, received from the radar receiver. This data includes two types of signals, the reflections from the underground object as well as the reflected signals from each of the repeaters 13. The repeater signals are processed to provide a direct measurement of distance of each repeater from the mobile radar unit when the radar data was recorded. This technique is embodied in the motion compensation processing unit 51 which calculates the radar position of each set of data. Alternatively, inertial navigation/GPS data 59 can be used in lieu of the data received from the phase reference repeaters 13. After the motion compensation, the corrected data appears as if the radar path or a circle of constant radius about the region of interest 12.

Focused SAR calculations require a model of the ground characteristics 52. This model may be constructed in a variety of ways including iterative calculation procedures using the radar data. The model must describe the electrical characteristics of the ground and each frequency used, and, if needed, the different layers of specified thicknesses in the ground. Calculations are made for the complete three-dimensional object space. The full volume three-dimensional SAR calculations 53 are used to determine the underground object location by determining the peak correlation of the radar signal with the filter matched to the target of interest. This data is deliberately formed to provide relatively coarse resolution using large volume elements (voxels) to allow rapid computation. Coarse resolution provides for either automatic or operator-assisted selection of volumes of interest. This data can be presented on a three-dimensional display 54.

Most of the total volume of the underground region of interest is likely to be free of significant scattered energy indicating absence of an underground object and can therefore be eliminated from further calculations. Regions having significant scattered energy are subjected to more detailed analysis for underground object detection and localization as indicated by reference numeral 55. In the block labelled Fine Grain Object Area Processing 56, the selected region is analyzed in more detail using smaller voxels. This fine grain processing provides a better focused three-dimensional map of the underground regions likely to contain objects.

The invention also includes the ability to store a large number of underground reflectivity characteristics in data tables 57. These data tables include the possible object's reflection, spatial variations of this reflection as well as frequency variations when embedded in a ground medium of particular electro characteristics. Multiple tables are used to show the reflectance characteristics for different underground object orientations.

By comparing the observed underground object scattering characteristics with the library of known characteristics of various stored underground objects, the correlation of the observed scattering with that of known underground object types and orientations is calculated. The underground object reflectivity will show variations with illumination angle and with frequency. This function is performed in the object matching and recognition algorithm 58. This correlation data is used to form a three-dimensional map of the underground objects which is displayed using various imaging hardware and software.

The library of known characteristics is stored on various conventional solid-state memory devices and other media known in the art. This library is associated with a computer which is used to process the information received from the radar and make the appropriate correlations and calculations to determine the composition of the surface area of interest. The computer an be located at a site remote from the airborne or ground based vehicle. Alternatively, the computer can be located proximate to these vehicles. Various types of conventional communication links can be provided between the radar antenna and the computer.

The following relates to one implementation of the radar system according to the present invention. It is noted that various changes can be made to the specific ranges, frequencies, sweeps, etc. without going beyond the scope of this invention.

As shown in FIG. 3, the generation of a transmitted waveform is accomplished utilizing a waveform generator 24 which generates very linear FM sweep modulation as well as the synchronized timing patterns for alternately transmitting or receiving information during the many intervals within a single sweep. For each of the receiving intervals, the received underground object scattering energy and clutter energy is sampled at least once and the sampling process is also synchronized to the overall waveform. Modern digital techniques used in generating the waveform permit an operator to choose a few constraints and have the operational software implement an optimal waveform. Typical operational and waveform parameters are as follows:

| | |
|---|---|
| Maximum Range of Interest | 30 to 300 meters |
| Maximum Radar Velocity | 0.5 to 5 meters per second |
| Sweep Start Frequency | 10 to 50 MHz |
| Sweep Stop Frequency | 500 to 2,000 MHz |
| Sweep Duration | 10 to 100 milliseconds |
| Samples per Sweep | 1,000 to 10,000 typical |
| Sample Rates | 50,000 to 500,000 samples per second |

As illustrated in FIG. 2, the waveform generator 24 feeds a transmitter power amplifier of the transmitter 20 where the RF signal is amplified to typical levels of 5 to 100 watts. The transmitter output is applied to the antenna 11 through the transmit/receive switch 23. The transmitter ON duration is typically in the range of 0.1 to 3 microseconds. At the end of the transmit period, the transmit/receive switch 23 is rapidly changed to the receive condition, the transmitter is turned OFF and the receiver is turned ON. These three things occur in a time related to the round trip propagation time to the shortest range of interest. Switching times in the order of nanoseconds are typically required.

The receiver is turned ON for a duration of time equal to the round trip propagation time to the maximum range of interest, typically in the range of 0.1 to 3 microseconds. At approximately the end of the receive interval, the receive signals are translated to baseband, are sampled in both the I and Q channels 28. These samples are digitized by standard analog to digital converters (typically 16 bit resolution). The receive signals describe the energy scattered by buried objects as well as energy scattered by other parts of the environment (clutter).

The digitized I and Q sample words are routed to a data recording device 27 and also to the FST process used to generate a real time display. The real time display is created from monitoring the data gathering process and not for providing an ultimate resolution image of the underground volume.

While the radar is gathering the data about underground object clutter, it is also calculating position data from the repeaters placed in the underground object area or utilizing the GPS. The repeaters retransmit a replica of the received energy with a distinctive modulation for each repeater. This distinctive modulation allows the range to each of the typically three repeaters to be measured and distinguished from each other and from the general underground object and clutter returns. The range of each of the repeaters is included in the data being recorded. The final three-dimensional image generation is then deferred. A graphics work station computer would be used to create this image.

The first step in computer processing of the recorded is the motion conversation step as described hereinabove. The recorded data includes not only the usual underground object and clutter information but also the distinctively modulated returns from each of the three or more repeaters. The repeater returns are processed to determine the radar's distance from each of them. The three distances uniquely define the exact position of the radar with respect to the underground object area to an accuracy of the order of an inch. The location information derived from the repeater data or from the GPS data is used to compensate for any deviations in the radar motion from an ideal circle or ellipse. When corrected, the underground object reflected signal data from separate angles can be combined in a phase sensitive process.

Following the motion compensation, a coarse resolution three-dimensional image of the overall underground object volume is developed. This coarse resolution image is used to improve the overall efficiency of the three-dimensional imaging process by identifying regions of interest and regions of no interest on the basis of reflective signal energy. The computational intensive fine grain three-dimensional image calculations need only be done for regions where enough energy exists to indicate the potential existence of an underground object and to merit additional processing.

The fine grain three-dimensional image calculations make use of a detailed model of the electrical properties of the ground. This model provides information on the velocity of propagation and the signal attenuation in the ground for the various frequencies used by the radar. The ultimate image resolution and detail are dependent on the accuracy of the model which includes layers of different materials as often comprise the subsurface environment.

Automatic underground object detection, location and identification makes use of extensive tables of underground object scattering. Specific types of underground objects, such as a 55 gallon barrel, can be measured or computer modeled and the scattering characteristics tabulated for a variety of conditions. Each table within this invention describes the scattering as a function of frequency and angle and radar polarization. Cross-correlation processes comparing the observed volume returns with the tables of known scattering characteristics of particular types of underground objects yield statistical measures of the likelihood of presence of a given type of underground object at a given orientation.

The output from the image processing is the automatic underground object identification plus the actual three-dimensional images of the subsurface environment, usually including the relatively smaller volumes meriting significant attention. The three-dimensional images are displayed or recorded in any of the usual methods used for displaying three dimensional information.

It will be understood that modifications and variations may be affected without departing from the spirit and scope of the novel concepts of the invention.

What is claimed is:

1. A system for investigating a subsurface area of interest, comprising:
    a radar platform circumscribing the subsurface area of interest;
    a radar antenna including a transmitter and a receiver provided on said radar platform for transmitting an interrupted frequency modulated continuous wave (FMCW) directed to the subsurface area of interest and receiving a reflected wave from the subsurface are of interest, said FMCW being transmitted as said vehicle circumscribes the subsurface area of interest, and said reflected wave being received by said radar antenna when said vehicle circumscribes the subsurface area of interest;
    processing device in communication with said radar antenna for processing said reflected wave;
    memory device in communication with said processing device including a library of known characteristics of underground objects and ground characteristics, said processing device providing an output based upon a comparison of said reflected wave and said library of known characteristics of underground objects and ground characteristics; and
    a first display device for displaying said output produced by said processing device.

2. The system in accordance with claim 1, further including a second display for displaying said reflected wave on a real time basis.

3. The system in accordance with claim 1, wherein said first display displays a three-dimensional image.

4. The system in accordance with claim 2, wherein said first display displays a three-dimensional image.

5. The system in accordance with claim 1, wherein a waveform generator is provided between said transmitter and said receiver.

6. The system in accordance with claim 1, wherein said radar platform is an airborne vehicle or spaceborne vehicle.

7. The system in accordance with claim 1, wherein said radar platform is a ground based vehicle or an individual or group of individuals.

8. The system in accordance with claim 1, further including a positioning means in communication with said radar antenna for locating said radar antenna relative to the subsurface area of interest.

9. The system in accordance with claim 8, wherein said positioning means includes at least three phase repeaters provided on the earth's surface around the subsurface area of interest.

10. The system in accordance with claim 8, wherein said positioning means utilizes GPS data.

11. The system in accordance with claim 1, wherein said FMCW is directed at the subsurface area of interest at approximately the Brewster angle.

12. A method for investigating a subsurface area of interest, comprising:
    irradiating the subsurface area of interest with an interrupted frequency modulated continuous wave (FMCW) from an antenna, as said antenna circumscribes the subsurface area of interest;
    receiving a reflected wave from the subsurface area of interest, said reflected wave received by said antenna, said reflected wave containing information relating to said subsurface area of interest;
    processing said reflected wave to provide output data;
    determining the location of an object in the subsurface area of interest by comparing said output data to stored data relating to ground characteristics of the subsurface area of interest and underground objects; and
    providing a three-dimensional output display based upon said determining step.

13. The method in accordance with claim 12, wherein said antenna is provided on an airborne vehicle.

14. The method in accordance with claim 12, wherein said antenna is provided on a ground based vehicle.

15. The method in accordance with claim 12, further including the step of locating the position of said antenna relative to the subsurface area of interest.

16. The method in accordance with claim 15, wherein said locating step includes the step of providing at least three phase repeaters provided on the earth's surface around the subsurface area of interest, each of said repeaters transmitting a unique signal received by said antenna.

17. The method in accordance with claim 15, wherein said locating step includes the step of said antenna receiving GPS data.

18. The method in accordance with claim 12, wherein said FMCW is directed at the subsurface are of interest at approximately the Brewster angle.

19. The method in accordance with claim 12, wherein said determining step includes initially providing a coarse resolution of data by utilizing large volume elements for the entire output data produced by said processing step.

20. The method in accordance with claim 12, further including the step of analyzing regions of significant interest using a fine grain object processing step to produce smaller volume elements.

* * * * *